(12) United States Patent
Kirpalani

(10) Patent No.: US 10,910,848 B1
(45) Date of Patent: Feb. 2, 2021

(54) POWER MANAGEMENT CIRCUITRY FOR A CONSOLE

(71) Applicant: 2048450 Ontario INC (Datatech), Markham (CA)

(72) Inventor: Mohit Kirpalani, Markham (CA)

(73) Assignee: 2048450 Ontario Inc, Ontario (CA)

( * ) Notice: Subject to any disclaimer, the term of this patent is extended or adjusted under 35 U.S.C. 154(b) by 9 days.

(21) Appl. No.: 16/594,802

(22) Filed: Oct. 7, 2019

(51) Int. Cl.
*H02J 7/00* (2006.01)

(52) U.S. Cl.
CPC ............ *H02J 7/0022* (2013.01); *H02J 7/008* (2013.01); *H02J 7/0042* (2013.01); *H02J 7/0049* (2020.01)

(58) Field of Classification Search
CPC .................................................... H02J 7/0022
USPC ......................................................... 320/116
See application file for complete search history.

(56) References Cited

U.S. PATENT DOCUMENTS

| | | | | |
|---|---|---|---|---|
| 6,023,148 A * | 2/2000 | Pignolet | ................. | G06F 1/188 320/119 |
| 2009/0154148 A1* | 6/2009 | Meyer | ....................... | F21S 9/02 362/157 |
| 2016/0006299 A1* | 1/2016 | Myhre | ................. | H02J 7/0068 307/66 |
| 2017/0187205 A1* | 6/2017 | Li | .......................... | A47B 81/00 |
| 2020/0369171 A1* | 11/2020 | Schweitzer | ........... | H01M 10/63 |

* cited by examiner

*Primary Examiner* — Yalkew Fantu
(74) *Attorney, Agent, or Firm* — IPpro Services

(57) ABSTRACT

The invention provides power management circuitry for a console. The power management circuitry includes a charging component which includes an integrated circuit for managing the output current separately for charging the battery and for running the console. The integrated circuit comprises a first pin and a second pin to output current which provides voltage (VBAT_SUPPLY) for charging the battery. A third pin and a fourth pin of the integrated circuit is used to output current which provides voltage (VBAT) for running the console. These pins are connected to form a parallel circuit, wherein the integrated circuit cuts off the output current of the first pin and the second pin when VBAT_SUPPLY voltage reaches 4.18V indicating that the battery is fully charged, thereby eliminating charging current and reducing the leakage current. Further, a charging circuit of the console enables bypassing the battery based on instructions received from a power management unit.

10 Claims, 3 Drawing Sheets

POWER MANAGEMENT CIRCUITRY FOR A CONSOLE

FIELD OF THE INVENTION

The present invention generally relates to layout of a Printed Circuit Board (PCB) designed for computing devices. Specifically, the invention relates to layout of a PCB designed for a console that includes power management circuitry, for providing efficient power management capability for the console.

BACKGROUND OF THE INVENTION

Considering the PCB layout of existing computing devices, it is seen that these devices have numerous ports and sockets dedicated for various functions, the power consumption of such devices is higher, and the power management capability of such devices is inefficient.

Erstwhile power management solutions for computing devices include a power management circuitry which comprises an integrated circuit (IC), wherein the pins of the IC form a series circuit. Thus, a single output terminal is used for both running the system and charging the battery. Also, a power management unit (PMU) IC only reads the voltage and current data of a resistance to confirm if the battery was fully charged.

In such cases, an output current of the transistor is not large enough to support a computing device such as, but not limited to, a tablet, to run into system. When the tablet's power is ON, both the transistor and the battery, output current for running the tablet into the system. Therefore, if the battery is broken or the battery is low in voltage, the tablet cannot be run.

Therefore, in light of the above, there exists a need for a PCB layout design with a power management circuitry for enabling efficient power management in computing devices or consoles.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION OF THE INVENTION

Figure 1:
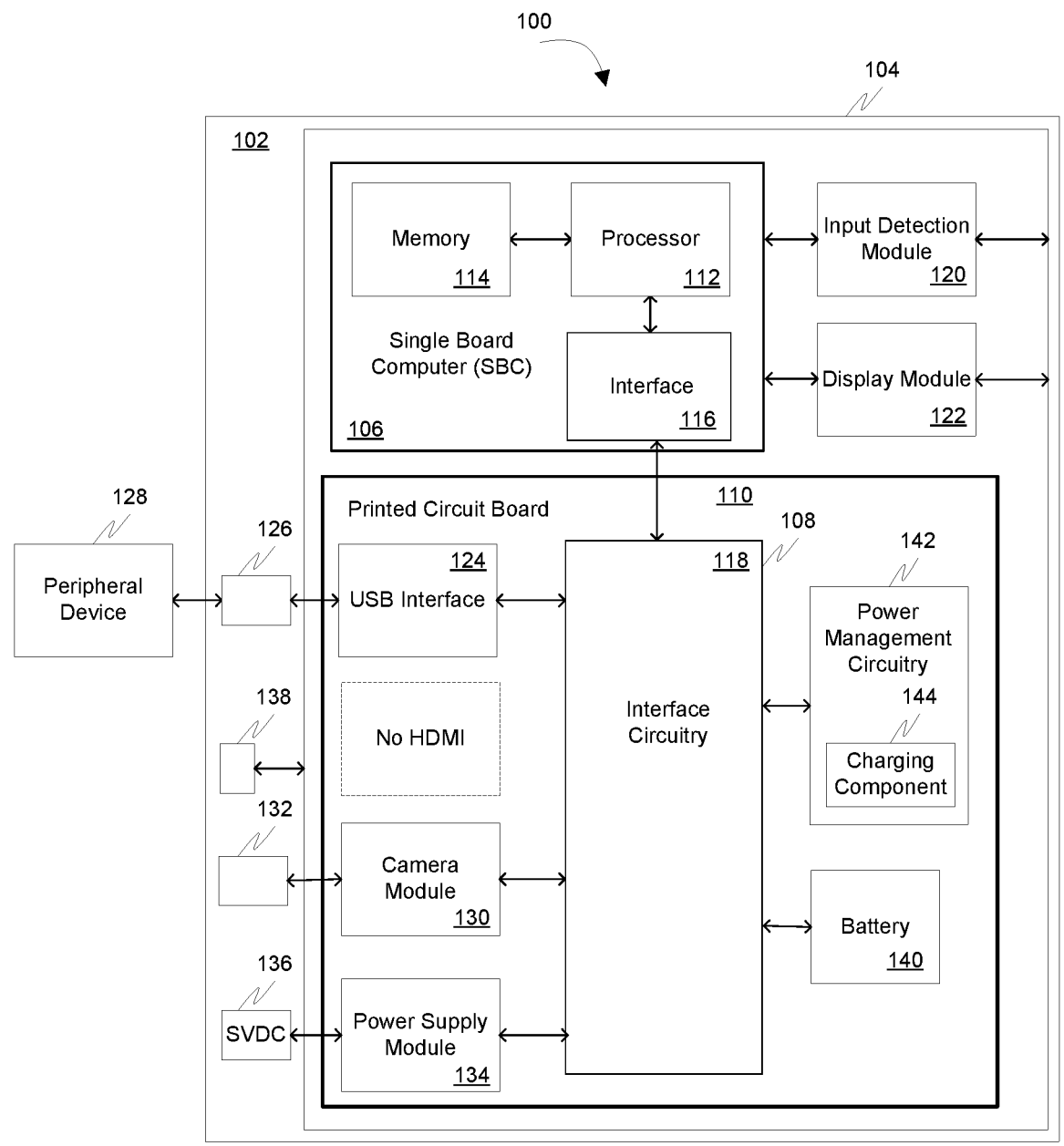
FIG. 1 illustrates a system that implements a console and PCB layout for the console in accordance with an embodiment of the invention.

Before describing in detail embodiments that are in accordance with the invention, it should be observed that the embodiments reside primarily in combinations of method steps and system components related to a layout of a Printed Circuit Board (PCB) for a console that includes power management circuitry, for providing efficient power management capability for the console.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a console which includes power management circuitry, for providing efficient power management capability for the console. The console comprises a body including a housing for receiving a Printed Circuit Board (PCB) layout including a PCB card configured to run an operating system of the console. The housing includes a front cover and a rear cover, the rear cover including a display. The PCB card further includes circuitry for managing a Universal Serial Bus (USB) interface by providing and/or receiving data by way of at least one connector. A USB socket associated with the USB interface provides only On-The-Go (OTG) functionality for data transmission in the console. Specifically, the USB socket does not provide the charging functionality for the console. The PCB card is devoid of a headphone jack component and a High Definition Multimedia Interface (HDMI). Further, the conventional headphone jack component of the PCB card is replaced by a DC 5-volt charging module. Further, the PCB card includes a battery and a power management circuitry. The power management circuitry includes a charging component which includes an integrated circuit for managing the output current separately for charging the battery and for running the console. The integrated circuit comprises a first pin and a second pin to output current which provides voltage (VBAT_SUPPLY) for charging the battery. A third pin and a fourth pin of the integrated circuit is used to output current which provides voltage (VBAT) for running the console. The first pin, the second pin, the third pin and the fourth pin are connected to form a parallel circuit, wherein the integrated circuit cuts off the output current of the first pin and the second pin when VBAT_SUPPLY voltage reaches 4.18V indicating that the battery is fully charged, thereby eliminating charging current and reducing the leakage current. Further, a charging circuit of the console enables bypassing the battery based on instructions received from a power management unit (PMU), wherein the PMU is connected to pins of the integrated circuit which either engages/disengages the battery via a switch in the integrated circuit, and accordingly the console is run using only DC power provided via an adapter.

FIG. 1 illustrates a system 100 that implements a console 102 and a PCB layout for console 102 in accordance with an embodiment of the invention. Console 102 can be, but need not be limited to, a mobile device, a tablet, a phablet, a laptop, an Ultra-Mobile Personal Computer (UMPC), a Mobile Internet Device (MID), a Personal Digital Assistant (PDA), a web pad and a handheld personal computer and an electronic device of any screen size. In some embodiments, console 102 is used as a point-of-sale (POS) device.

As illustrated in FIG. 1, console 102 consists of a housing 104 enclosing a Single Board Computer (SBC) 106 and a Printed Circuit Board (PCB) layout 108 including a PCB card 110 communicatively coupled to SBC 106. PCB card 110 is configured to run an operating system of console 102.

SBC 106 includes a processor 112, a memory 114, and an interface 116. Processor 112 includes circuitry such as one or more processors for executing instructions and can include, but need not be limited to, a microcontroller, a Digital Signal Processor (DSP), an Application Specific Integrated Circuit (ASIC), a Field Programmable Gate Array (FPGA), hard-wired logic, analog circuitry and/or a combination thereof.

Memory 114 can include, but not limited to, a Dynamic Random-Access Memory (DRAM) or other type of memory used to store computer-executable instructions for execution by processor 112. Memory 114 may also store data used by processor 112 in executing computer executable instructions. In one embodiment, processor 112 and memory 114 may be combined as a system on a chip (SoC).

Interface 116 allows processor 112 to communicate with components of PCB card 110 via interface circuitry 118 provided on PCB card 110 and to receive power from interface circuitry 118. In one implementation, interface 116 can include a connector such as Small Outline Dual In-Line Memory Module (SO-DIMM) pins that connect into a SO-DIMM socket of interface circuitry 118 provided on PCB card 110.

SBC 106 further interfaces with an input detection module 120 and a display module 122. Input detection module 120 detects input operations that may be provided via a keyboard, a mouse or touch inputs. Display module 122 controls a display panel including, but not limited to, Liquid Crystal Display (LCD), an Organic Light Emitting Diode (OLED) panel, e-paper or any other type of display. A touch sensor may be integrally disposed on the surface of the display panel. The touch sensor is a capacitive or pressure-sensitive sensor, detects touch operations by the user's finger, stylus, or similar device, and inputs a signal indicating the position where the operation was detected to input detection module 120. When an operation is detected, the input detection module 120 generates coordinate data expressing the position of the detected operation in coordinates corresponding to the display position on the touch panel.

PCB card 110 includes circuitry for managing a Universal Serial Bus (USB) interface 124 by providing and/or receiving data by way of one or more connectors. A USB socket 126 is associated with USB interface 124 and provides only On-The-Go (OTG) functionality for data transmission in console 102. Specifically, USB socket 126 does not provide charging functionality for console 102.

USB interface 124 interfaces with one or more USB devices via USB socket 126 for connecting console 102 to a peripheral device 128. Peripheral device 128 can be, but need not be limited to, a printer, and a postage meter. Since console 102 is interfaced with peripheral device 128, USB socket 126 is required only for the purpose of providing the OTG functionality and the charging functionality is not required.

Further, PCB card 110 is devoid of a High Definition Multimedia Interface (HDMI) and a headphone jack component. PCB card 110 further includes a camera module 130 connected to a camera port 132 that includes functionality only for a front camera of 0.3 M, and is devoid of functionality for a rear camera. The HDMI, the headphone jack component and the rear camera are not required as console 102 is always connected to peripheral device 128.

Further, PCB card 110 includes a power supply module 134 connected to charging port 136 that provides a DC 5-volt charge to console 102. Power supply module 134 is used in place of the conventional headphone jack component because console 102 is connected to peripheral device 128 and will turn off and on when peripheral device 128 is turned off and on, and the built-in battery of console 102 provides only trickle charge.

Housing 104 includes a front cover and a rear cover, the front cover including the display panel.

The rear cover of housing 104 protects console 102 during transportation, either before putting console 102 inside peripheral device 128 or even while console 102 is inside peripheral device 128. The rear cover is customized for console 102 as the conventional socket/ports have been changed and the conventional headphone jack has been removed.

The rear cover includes a plurality of connection points that connect to different components of PCB card 110 including a connection point connected to charging port 136 of power supply module 134, a connection point for a RESET socket 138 and a connection point connected to USB socket 126.

PCB card 110 further includes a battery 140 and a power management circuitry 142. Power management circuitry 142 includes a charging component 144 which includes an integrated circuit (IC) for managing the output current separately for charging battery 140 and for running console 102.

Figure 2:
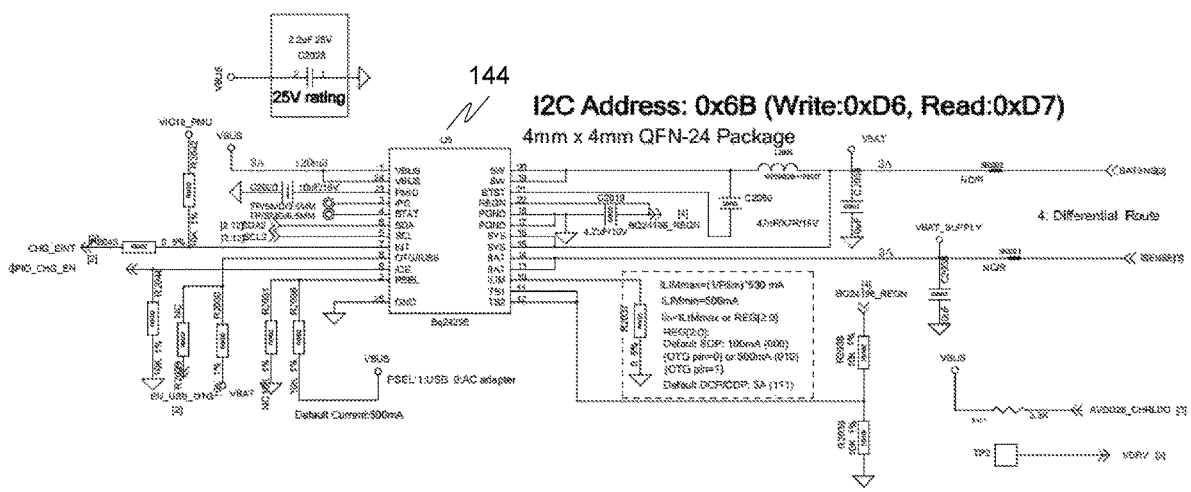
FIG. 2 illustrates a schematic diagram of power management circuitry for the console depicting a charging component in accordance with an embodiment of the invention.

FIG. 2 illustrates a schematic diagram of power management circuitry 142 for console 102 depicting charging component 144 in accordance with an embodiment of the invention.

As illustrated in FIG. 2, charging component 144 is IC U5 (BQ24296). The IC U5 manages the output current separately. PIN 13 and PIN 14 of IC U5 provide output voltage for battery charging, (VBAT_SUPPLY). PIN 15 and PIN 16 of IC U5 output voltage for running console 102 separately. The two output current circuits formed by PIN 13, PIN 14, PIN 15 and PIN 16 of IC U5 form a parallel circuit. When IC U5 reads the VBAT_SUPPLY voltage which reaches 4.18V (the battery is fully charged), IC U5 cuts output current of PIN 13 and PIN 14, therefore there is no charging current, but only a very small leakage current (about 159 µA).

Because the output current for charging battery 140 and the output current for running console 102 are a parallel circuit, even if battery 140 is not welded in or battery 140 is broken, output current of PIN 15 and PIN 16 is still larger enough to support running console 102 into system.

In accordance with an exemplary embodiment of the invention, specifications and features of console 102 is described in detail as follows.

Hardware of console 102 includes a central processing unit (CPU), a graphics processing unit (GPU) (3D graphics accelerator capable of processing 115M tri/second 1.0G pixel/sec @ 520 MHz OpenCL 1.2 embedded profile), a Random-Access Memory (RAM) (2 GB or more) and an internal storage (16 GB or more). An Android version (version 8 or higher) of the OS is employed for console 102.

Display module 122 includes a display of display resolution: 7" 1024×600, display brightness: 330 nits, display contrast ratio: 500:1 (min), display color: 16.7 M, display color depth: 16-bit RGB, display technology: liquid-crystal display (LCD) in-plane switching (IPS), display surface: glass+protection film, video: can support MP4, MOV, 3GP AV1, and touch screen: 5 points capacitive multi touch.

Console 102 further includes an audio speaker: 1 W mono speaker min, and a means to adjust the volume (can be software controlled). The audio component does not include a headphone jack and a microphone.

With respect to connectivity in console 102, connectivity is provided via USB (USB 2.0), Wi-Fi (supports 802.11 a/b/g/n) and Bluetooth (supports V4.0 BLE).

Camera module 130 includes a front camera (2 MP) and no back camera. Further, console 102 does not include any sensors such as, but not limited to, compass magnetometer, proximity sensor, ambient light sensor, gyroscope, barometer, and temperature sensor.

Buttons on console 102 include only power buttons to provide display turn-off, console 102 power on/off functions. Further, console 102 is provided the following features: console 102 to auto start-up when +5 V power on, and console 102 to auto shut down after 8 seconds trailing the +5 V power off. There are no volume buttons, rotation lock buttons, back buttons or home buttons.

The power component of console 102 includes a power jack: barrel type female receptacle with dimensions 0.7 mm×2.35 mm, PCB mid-mount, capable of delivering 5 V DC at 2 amps minimum, and the power consumption is 1 amp (typical) at 5 V 2 amps (max) at +5 V.

Battery 140 is a Rechargeable polymer lithium-ion battery with initial capacity: nominal 2600 mah single cell, voltage: average 3.7V with standard discharge: 3.6 V working, 4.0~4.1 V peak, 3.4 V~3.5 V cut off, standard charge: 0.2 c constant current, 4.0 V~4.1 V charge voltage cut off suggested for a longer battery life, standard discharge: 0.2 c constant current, 3.4 V~3.5 V. Discharge cuts off leading to shut down. If console 102 charger does not shut down console 102 upon reaching this discharging cut off threshold, there is no guarantee that console 102's data can be protected during the next power down, max. discharging Rate: 2.0 and amp limited by PCB. The life of battery 140 may be up to 7 years and uses cases include, but need not be limited to, console 102 is ON for 24 hours a day, is ON for 8 hours a day, is ON for 1 hour a day, is ON for 10 mins 8 times a day, and is ON for 2 hours a week.

Environmental impact on battery 140 includes min. max. temp=0.55-degree measure inside console 102, and relative humidity=45~90%. The storage capacity is greater than 96% recoverable capacity retained after 1 year of storage at 25 degrees with 40% charge level. The battery protection circuit includes a warning system with control over charge, over discharge, over temperature, over voltage and overcurrent. PCB (2.0 A) installed with the battery pack is used to protect the battery from overcharge (>4.2 V), over discharge (<2.5 V), over drain (>2.0 A), and short circuits, and ensures battery safety: over-charge, over discharge, external short circuit, forced-discharge, thermal, altitude, vibration, shock and impact/crush proof, and no explosion and fire.

The size dimensions of console 102 can be, but need not be limited to, 188.6×108.5×10.6 mm.

In accordance with an embodiment, power management circuitry 142 includes a charging circuit for bypassing battery 140. The charging circuit is further described in detail in conjunction with FIG. 3.

Figure 3:
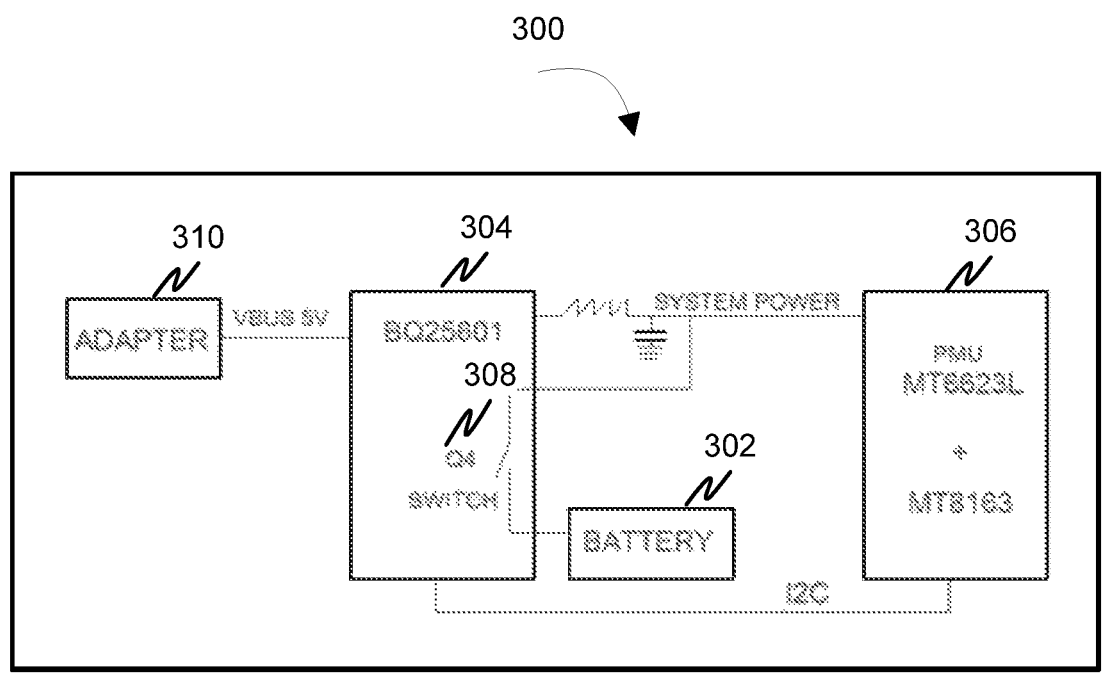
FIG. 3 illustrates a schematic diagram of a charging circuit for the console for bypassing the battery in accordance with an embodiment of the invention.

FIG. 3 illustrates a schematic diagram of a charging circuit 300 for console 102 for bypassing battery 302 in accordance with an embodiment of the invention.

As illustrated in FIG. 3, charging circuit 300 includes IC 304 (BQ25601). A power management unit (PMU) 306 connects to IC 304 by PIN 5 SCL and PIN 6 SDA (as illustrated in FIG. 2) to enable PMU 306 to communicate with IC 304.

IC 304 includes a Q4 switch 308 which either engages or disengages the battery based on instructions received from PMU 306.

When DC power is connected to console 102 via an adapter 310, PMU 306 detects that the DC power is connected and PMU 306 starts file preloading (before booting). PMU 306 then sends out a signal to instruct Q4 switch 308 to be open/OFF always, therefore, after booting, console 102 will only use the DC power, and will never go through battery 302 to check if it is full or not. The battery bypass function is thus realized in this manner and a battery charger is not required any more.

In an implementation, an application (app) is used for enabling DC powered devices to be used without the battery following the mechanism illustrated above. Thus, console 102 operates even if there is no battery.

Various embodiments of the present invention provide a PCB layout specifically tailored for a console which includes power management circuitry for efficient power management in the console.

The charging component of the power management circuitry includes an IC with a parallel circuit for managing the output current separately, for charging the battery and for running the console.

Hence, when the VBAT_SUPPLY voltage reaches 4.18V (the battery is fully charged), the IC cuts off the output current from one circuit, therefore eliminating the charging current and reducing the leakage current.

Also, since the output current circuit for charging for battery and the output current circuit for running the console are a parallel circuit, even if the battery is not welded in or the battery is broken, the output current from the second parallel circuit is still large enough to support the running of the console into the system.

Further, the charging circuit of the console bypasses the battery by disengaging the battery and enabling the console to run using only the DC power connected to the console. In some cases, the charging circuit runs the console, even if there is no battery.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A console, comprising:
a body comprising a housing including a front cover and a rear cover, the front cover including a display, the housing receiving a Printed Circuit Board (PCB) layout including a PCB card configured to run an operating system of the console, the PCB card being devoid of a headphone jack component and a High Definition Multimedia Interface (HDMI), the PCB card comprising:
circuitry for managing a Universal Serial Bus (USB) interface by providing and/or receiving data by way of at least one connector;
a USB socket associated with the USB interface for providing only On-The-Go (OTG) functionality for data transmission in the console, wherein the USB socket does not provide charging functionality for the console;
a Direct Current (DC) 5-volt charging module;
a battery; and
a power management circuitry comprising:
a charging component which includes an integrated circuit for managing the output current separately for charging the battery and for running the console, the integrated circuit comprising:
a first pin and a second pin of the integrated circuit to output current which provides voltage (VBAT_SUPPLY) for charging the battery; and
a third pin and a fourth pin of the integrated circuit to output current which provides voltage (VBAT) for running the console, wherein the first pin, the second pin, the third pin and the fourth pin are connected to form a parallel circuit, wherein the integrated circuit cuts off the output current of the first pin and the second pin when VBAT_SUPPLY voltage reaches 4.18V indicating that the battery is fully charged, thereby eliminating charging current and reducing the leakage current.

2. The console of claim 1, wherein the console is one of a mobile device, a tablet, a phablet, a laptop, an Ultra-Mobile Personal Computer (UMPC), a Mobile Internet Device (MID), a Personal Digital Assistant (PDA), a web pad and a handheld personal computer and an electronic device of any screen size.

3. The console of claim 1, wherein the PCB card further comprises a camera module, wherein the camera module includes functionality only for a front camera and is devoid of a rear camera.

4. The console of claim 1, wherein the rear cover includes an arrangement of a plurality of connection points, wherein a first connection point of the plurality of connection points is connected to a charging socket of the DC 5-volt charging module, a second connection point of the plurality of connection points is connected to a RESET socket and a third connection point of the plurality of connection points is connected to the USB socket.

5. The console of claim 1, wherein the console interfaces with a peripheral device via the USB socket, wherein the peripheral device is one of a printer and a postage meter.

6. The console of claim 1, wherein the console is used as a point-of-sale (POS) terminal.

7. The console of claim 1, wherein the console interfaces with connected work-out devices via the USB socket, wherein a workout device is one of a treadmill, a cycling equipment, a rowing machine, a stepper and a climber.

8. The console of claim 1, wherein the output current of the third pin and the fourth pin are still large enough to support the running of the console even if the battery is not welded in or is broken.

9. The console of claim 1, wherein power management circuitry includes a charging circuit for bypassing the battery based on instructions received from a power management unit (PMU).

10. The console of claim 9, wherein the PMU is connected to pins of the integrated circuit which disengages the battery via a switch in the integrated circuit, and accordingly the console is run using only DC power provided via an adapter.

* * * * *